UNITED STATES PATENT OFFICE 2,411,779

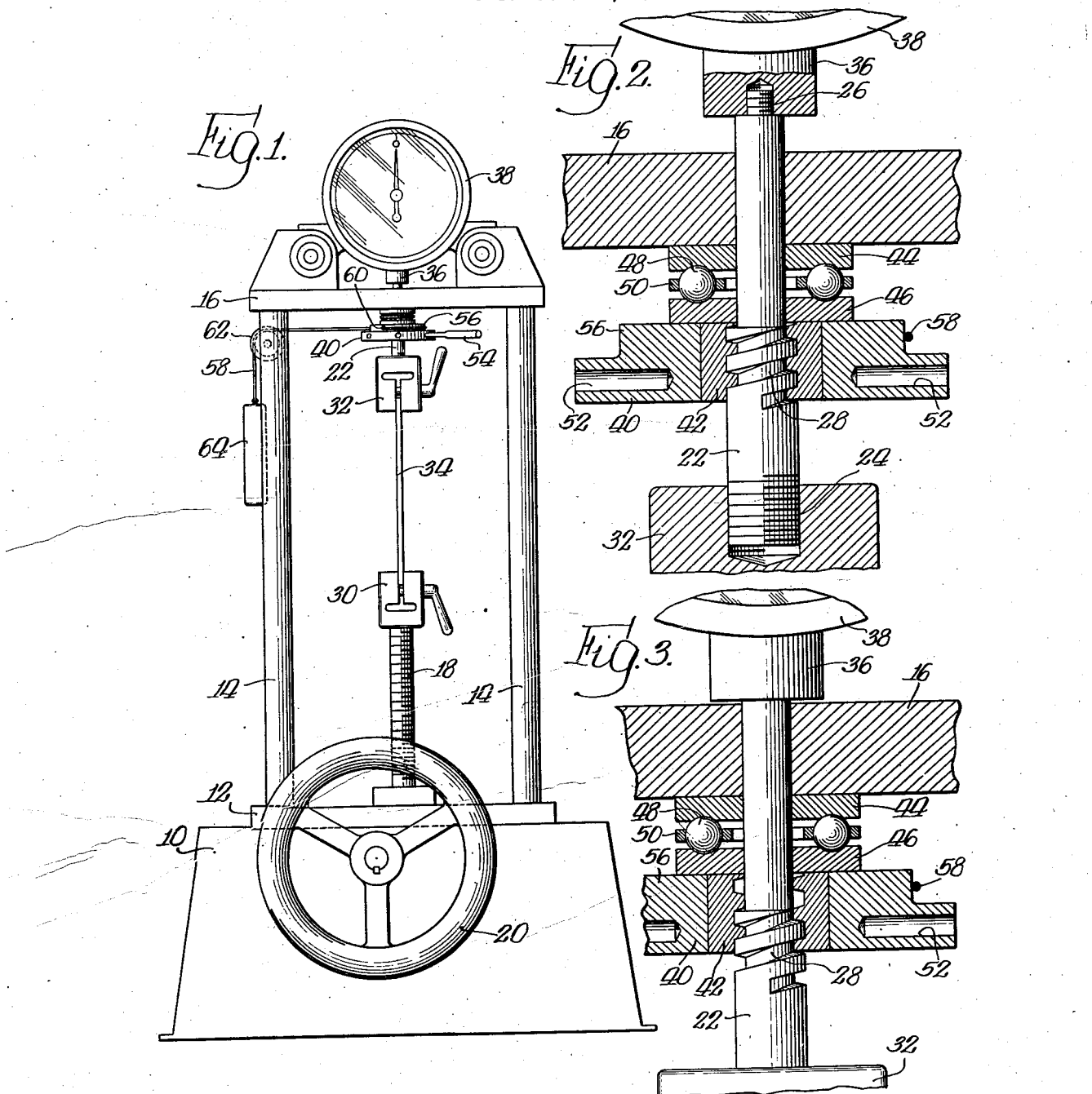

SHOCK ABSORBING MEANS FOR TENSION TESTING MACHINES

Edwin I. Dillon and Robert E. Dillon, Chicago, Ill., assignors to W. C. Dillon & Company, Inc., Chicago, Ill., a corporation of Illinois Application February 14, 1944, Serial No. 522,252

9 Claims. (Cl. 73—95)

Our present invention relates to a shock absorber particularly adapted for a tensile tester although it is applicable wherever a developed stress or load is to be released so as to prevent immediate unloading of such stress upon an indicating device or the like such as a dynamometer.

One object of the invention is to provide a shock absorber assembly which is very simple in construction, is easy to manufacture and install, is inexpensive, and is fool-proof in its operation.

Another object is to provide a shock absorber which permits free movement of a load carrying element relative to an abutment so that accurate dynamometer readings can be taken, but which automatically takes up the play between the load carrying element and the abutment so that in case of breakage of the specimen and the consequent sudden release of the load, the dynamometer is not violently brought back to zero position or on past such position by momentum. Thereby, any damage to the dynamometer is eliminated and its life is lengthened many times while its accuracy remains unimpaired.

More particularly, it is our object to provide a shock absorber in the form of a nut that takes up any developed play, the nut being automatically rotated by a flexible element wound around the nut and a weight connected with the flexible element.

With these and other objects in view, our invention consists in the construction, arrangement and combination of the various parts of our shock absorber structure whereby the objects contemplated are attained, as hereinafter more fully set forth, pointed out in our claims, and illustrated in the accompanying drawing, wherein:

Figure 1 is a front elevation of a tensile tester with our shock absorber mounted thereon.

Figure 2 is a vertical sectional view on an enlarged scale showing details of the shock absorber when no load is imposed thereon; and, Figure 3 is a similar sectional view of the absorber after load has been applied and has thereby changed the position of the parts of the shock absorber.

On the accompanying drawing we have used the reference numeral 10 to indicate the base of a tensile tester which has mounted thereon a relatively heavy lower platen 12. Rod-like uprights 14 rise from the platen 12 and are surmounted by a second and upper platen 16.

A threaded loading rod 18 extends upwardly from the platen 12, and through suitable stepdown gearing and a rotating nut, may be propelled slowly into the base by a hand wheel 20.

The operative connection between the shaft of the hand wheel and the load screw 18 is believed obvious and is not part of our present invention. Accordingly the details thereof have not been illustrated.

Extending upwardly and slidable through the upper platen 16 is a load carrying element 22 in the form of a shaft having threads 24 and 26 on its lower and upper ends, and intermediate its ends, a relatively coarse thread 28. Specimen grips 30 and 32 are connected with the threaded shaft 18 and the load carrying element 22 respectively for the purpose of holding a specimen 34.

The threads 26 of the load carrying element 22 connect it with a movable stud 36 of a dynamometer 38 whereby the tension on the specimen 34 as applied thereto by the hand wheel 20 and the loading screw 18 may be measured and indicated.

Our shock absorber assembly will now be described: It includes a nut 40 preferably of steel having a bearing insert 42, as of bronze, internally threaded to coact with the threads 28 of the load carrying element 22. Ordinarily, the element 22 is not provided with the threads 28, but where we apply our shock absorber to the tensile tester, the threads are provided. A nut 40 is mounted below the upper platen 16 and between them a suitable thrust bearing is interposed. This bearing may be of ball or roller type, it being illustrated as constructed of two flat washers 44 and 46 with balls 48 between them, the balls being held in a retainer plate 50.

The nut 40 has a plurality of openings 52 into which a handle 54 may be inserted for leverage in turning the nut as will hereinafter appear. The nut also has a drum-like portion 56 around which a flexible element such as a cable 58 is wound, and anchored at one point as indicated at 60. The cable 58 extends over a pulley 62 supported by one of the uprights 14 and then downwardly. A weight 64 is secured to its lower end to keep it taut and impose a continuous bias on the nut 40 tending to rotate it.

Practical operation

In the operation of our shock absorber, with the parts in the position of Figure 1 and the handle 54 removed, the wheel 20 is rotated for testing the specimen 34 under tension and the pull thereon is indicated on the dial of the dynamometer 38. As soon as the nut 40 moves downwardly relative to the platen 16, the weight 64, due to its continuous exertion of pull on the cable 58, rotates the nut in a counter-clockwise direction (viewed from above) thereby crowding the nut against the thrust bearing 44—46—48 and the thrust bearing against the platen 16.

The size of the weight and the diameter of the drum 56 are calculated so that there is just enough turning bias on the nut to cause it to smoothly follow the thrust bearing and take up the play with neither lag nor rush to the normal action, and thereby accuracy of the dynamometer reading is not impaired by use of the shock absorber. The thrust bearing is always pressed firmly against the underside of the platen 16 and this action continues automatically and steadily from the time the load starts until the specimen ruptures.

When the specimen 34 does break, or when the load upon it is released by rotating the wheel 20 backwards, the load carrying element 22 would move upwardly through the platen 16 if there were no shock absorber provided. In the case of rupture of the specimen, movement would be quite violent, and would have great velocity of equal or greater power than initially applied by the screw 18 to rupture the specimen. This violent movement is detrimental to the life and accuracy of the dynamometer whereas with our shock absorber the movement is minimized.

When rupture occurs in a tensile tester to which our shock absorber has been applied, the play has been taken up by the nut 40 so that the sudden release of the load merely lets the upward movement of the load carrying element 22 be dissipated through the frame of the tensile tester by imposing the load on the platen 16 instead of letting it discharge into the dynamometer. The load is arrested and dissipation through the platen 16 is harmless to the tensile tester as it is transmitted through the rods 14 to the platen 12 and the load thrown on the relatively rugged frame instead of the more delicate dynamometer. Only a small part of the load is able to reach the dynamometer—that part represented by a very slight upward movement of the element 22 before the frame of the tensile tester absorbs the load. This small load transmitted to the dynamometer is only that which is able to bend the platens and they are heavy and reinforced against bending so that there is but very slight movement.

The load on the nut 40 may then be released manually by turning the nut in the opposite direction to its initial position by using the handle 54 until the nut is loose. When the handle is taken out the weight 64 rotates the nut to a tight position again for the beginning of another test. Where only light test loads are involved, the nut 40 may be rotated by hand without the necessity of using the handle 54.

From the foregoing it will be obvious that our device is quite simple in construction and will operate efficiently for the purpose intended. It has been shown only by way of illustration in connection with a tensile tester whereas it might be utilized in connection with any stress or load which must be released so as to prevent a full immediate unloading of the stress upon an indicating or other device that might be damaged thereby. The load is continuously snubbed by the nut 40 so that dissipation of the load when suddenly released is transmitted to an abutment against which the nut rotates as distinguished from being transmitted to a dynamometer or the like. The device is thereby a safety feature against injuring or destroying the accuracy of the dynamometer.

Certain changes such as the use of a spring instead of the weight 64 to provide a rotating bias on the nut 40 and many others may be made without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In a testing apparatus having a stationary abutment and a screw threaded load carrying element movable in response to the test load applied thereto and freely slidable in one direction in said abutment; shock absorbing means comprising a nut cooperating with the threads of said element, a single one-direction thrust bearing between said nut and said abutment, and means biasing said nut to rotate in a direction toward said abutment, said means comprising a flexible element wrapped around the nut, and a weight connected with the flexible element to exert a pull thereon, said nut limiting reverse sliding of said load carrying element relative to said abutment whereby sudden release of the load causes such movement of the load carrying element to be absorbed by the abutment.

2. In a testing apparatus having a stationary abutment and a screw threaded load carrying element movable in response to the test load applied thereto and freely slidable in one direction in said abutment; shock absorbing means comprising a nut cooperating with the threads on said element, a thrust bearing between said nut and said abutment, and means biasing said nut to rotate in a direction toward said abutment.

3. For use with a tension tester having a pair of platens with tie members connecting the platens together, a load applying element slidably movable through one of said platens, a load carrying element slidably movable through the other of said platens, a dynamometer carried by said tension tester to indicate the movement of said load carrying element relative to said other platen, grips associated with each of said elements for gripping a specimen, said load carrying element being threaded with the threads thereof normally located adjacent said other platen, a nut screwed thereon, a single thrust bearing between said nut and said other platen, and means to bias said nut to rotate in a direction towards said other platen, said nut being freely movable with said load carrying element away from said other platen and limiting reverse movement of said load carrying element relative to said other platen, whereby sudden release of the load causes such movement of the load carrying element to be absorbed by the tension tester instead of being transmitted to the dynamometer.

4. For use with a tension tester having a pair of platens with tie members connecting the platens together, a load applying element slidably movable through one of said platens, a load carrying element slidably movable through to the other of said platens, a dynamometer carried by said tension tester to indicate the movement of said load carrying element relative to said other platen, grips associated with each of said elements for gripping a specimen, said load carrying element being threaded with the threads thereof normally located adjacent said other platen, a nut screwed thereon, a thrust bearing between said nut and said other platen, said thrust bearing and said nut being freely movable with said load carrying element away from said other platen, and means to bias said nut to rotate in a direction toward said other platen, said last means comprising a flexible element wrapped around the nut, and a weight connected with said flexible element to exert pull thereon.

5. In a testing apparatus having a stationary abutment and a screw threaded load carrying element slidable therethrough and movable in response to the test load applied to said load carrying element, the threaded portion of said load carrying element being normally located adjacent said abutment; shock absorbing means comprising a nut cooperating with the threads on said element, and means biasing said nut to rotate in a direction toward said abutment, said means comprising a flexible element wrapped around the nut, and a weight connected with said flexible element to exert pull thereon, said nut being freely movable away from said abutment upon the application of a load to said load carrying element at a faster rate than the take-up rate of said flexible element and weight on said nut.

6. In a testing apparatus having a stationary abutment and a screw threaded load carrying element slidable therethrough and movable in response to the test load applied to said load carrying element, the threaded portion of said load carrying element being normally located adjacent said abutment; shock absorbing means comprising a nut cooperating with the threads on said element, and means biasing said nut to rotate in a direction towards said abutment, said nut being non-restricted in its movement away from said abutment.

7. In a testing apparatus having a stationary abutment and a screw threaded load carrying element slidable therethrough and movable in response to the test load applied to said load carrying element, the threaded portion of said load carrying element being normally located adjacent said abutment; shock absorbing means comprising a nut cooperating with the threads on said element, and means for continuously rotating said nut so that it remains against the side of said abutment in the direction that the load moves said load carrying element, said nut being freely movable away from said side of said abutment, and limiting reverse movement of said load carrying element relative to said abutment whereby sudden release of the load causes any reverse movement of the load carrying element to be absorbed by the abutment.

8. In a testing apparatus having a stationary abutment and a screw threaded load carrying element slidable therethrough and movable in response to the test load applied to said load carrying element, the threaded portion of said load carrying element being normally located adjacent said abutment; shock absorbing means comprising a nut cooperating with the threads on said element, a dynamometer connected with said load carrying element to indicate the movement thereof, and means for continuously rotating said nut so that it remains against the side of said abutment in the direction that the load moves said load carrying element, said nut limiting reverse movement of said load carrying element relative to said abutment whereby reverse movement of said load carrying element relative to said abutment caused by sudden release of the load is absorbed by the abutment instead of being transmitted to said dynamometer, said nut being at all times free to move with said load carrying element and away from said abutment.

9. In a testing apparatus having a stationary abutment, a screw threaded load carrying element slidable therethrough and movable in response to the test load applied to said load carrying element, the threaded portion of said load carrying element being normally located adjacent said abutment, and an indicator connected with said load carrying element to indicate the movement thereof; shock absorbing means comprising a nut cooperating with the threads of said element, a single thrust bearing for said nut and located between said nut and said abutment, and means biasing said nut to rotate in a direction toward said abutment to limit reverse movement of said load carrying element relative to said abutment whereby sudden release of the load causes such movement to be absorbed by the abutment instead of being transmitted to said indicator.

EDWIN I. DILLON.
ROBERT E. DILLON.